United States Patent [19]

Seguy

[11] 4,436,534

[45] Mar. 13, 1984

[54] METHOD FOR REDUCING DESORBENT CONSUMPTION IN RECOVERY SYSTEMS

[76] Inventor: Bernard R. Seguy, Amcec Corporation, 2625 Butterfield Rd., Oak Brook, Ill. 60521

[21] Appl. No.: 440,076

[22] Filed: Nov. 8, 1982

[51] Int. Cl.³ .............................................. B01D 53/04
[52] U.S. Cl. ........................................ 55/58; 55/59; 55/74
[58] Field of Search .................... 55/58, 59, 61, 62, 74, 55/179

[56] References Cited

U.S. PATENT DOCUMENTS

| | | | |
|---|---|---|---|
| 1,528,459 | 3/1925 | Voress et al. | 55/62 |
| 1,661,149 | 2/1928 | Barnebey | 55/179 X |
| 2,080,578 | 5/1937 | Ray | 55/179 |
| 2,114,810 | 4/1938 | Ray | 55/179 X |
| 2,211,162 | 8/1940 | Ray et al. | 55/179 X |
| 2,413,771 | 1/1947 | Luaces | 55/179 |
| 2,428,885 | 10/1947 | Luaces | 55/179 X |
| 2,818,133 | 12/1957 | Rosenthal | 55/59 |
| 3,252,273 | 5/1966 | Stephens | 55/179 |
| 3,458,973 | 8/1969 | Spencer et al. | 55/179 X |
| 3,884,661 | 5/1975 | Simonet | 55/62 |

FOREIGN PATENT DOCUMENTS

| | | |
|---|---|---|
| 1202764 | 10/1965 | Fed. Rep. of Germany . |
| 1619850 | 7/1970 | Fed. Rep. of Germany . |
| 2222400 | 11/1973 | Fed. Rep. of Germany . |
| 7315869 | 12/1977 | France . |

Primary Examiner—Robert H. Spitzer
Attorney, Agent, or Firm—Neuman, Williams, Anderson & Olson

[57] ABSTRACT

Methods for reducing the consumption of desorbent such as live steam during the desorption operation of recovery systems for chemical substances by reducing or terminating the input of desorbent to the adsorber at a predetermined time, such as when the level of chemical substance in the desorbent/chemical substance mixture leaving the adsorber reaches a predetermined low level, and recirculating through the adsorber a portion of the exiting desorbent/chemical substance mixture by the use of a propelling means.

22 Claims, 1 Drawing Figure

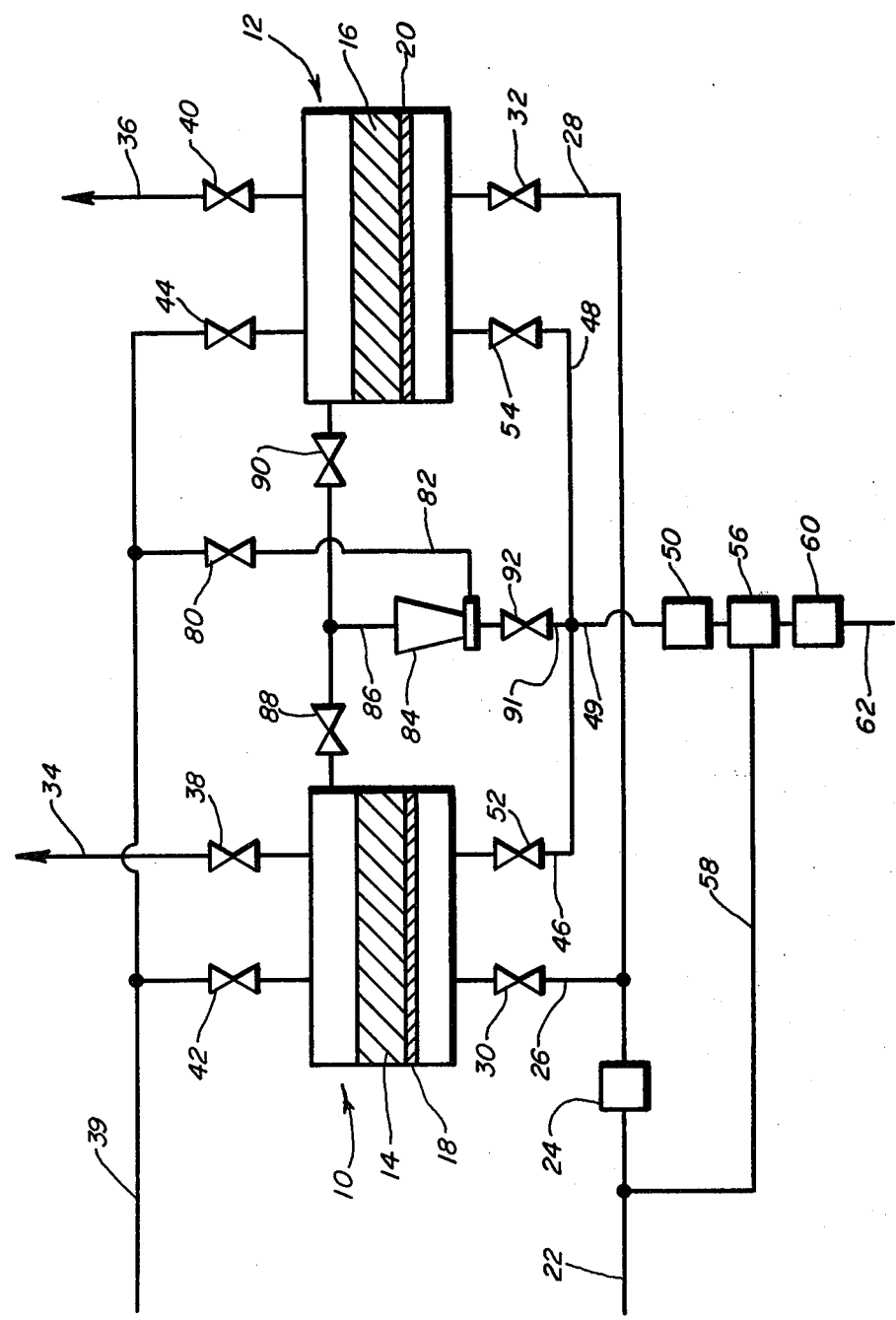

METHOD FOR REDUCING DESORBENT CONSUMPTION IN RECOVERY SYSTEMS

BACKGROUND OF THE INVENTION

This invention relates to methods for use in recovery systems wherein one or more adsorber vessels are used to adsorb chemical substances from a carrier medium, and live steam, for example, is the desorption medium. Solvents are typically the chemical substances to be adsorbed and recovered, and activated carbon is commonly used as the adsorbent.

In many industries, including the petrochemical, pharmaceutical, and printing industries, heavy use of solvents is made in a variety of activities. In many of these activities, solvents which are highly volatile may evaporate to the surrounding carrier medium which may be air or some other gas. This loss of solvents is undesirable for several reasons. Because solvents are expensive, their loss represents an additional operating cost of the user facility. Moreover, many evaporated solvents that are discharged into the atmosphere are pollutants owing to their odor, unsightliness, or danger to the environment. Thus, it is common for the solvent laden air or gas to be passed through a solvent recovery system, whereby the solvent is extracted by adsorption from the air or gas for reuse.

Recovery of a chemical substance in such a recovery system is not limited to solvents, however. Any chemical substance that may be adsorbed on an adsorbent medium can be recovered. The explanation of the present invention and its background will be in terms of solvent recovery systems for the sake of simplicity, but it is understood that such explanation is equally applicable to recovery systems for nonsolvent chemical substances that are adsorbable.

During the adsorption stage of a conventional recovery process, solvent laden gas is passed through an adsorber vessel, wherein a bed of adsorbent extracts the solvent from the gas by adsorption. The cleansed gas is then expelled from the adsorber; in the case where the gas is simply air, it can be expelled directly into the atmosphere. Just before the activated carbon becomes saturated with solvent and begins to allow undesirable amounts of solvent to pass, the adsorption vessel is removed from adsorption service, and the desorption or "scrubbing" stage commences.

During desorption, wherein steam will hereinafter be used as the example of a suitable desorption medium, live steam is passed through the adsorbent in the direction opposite to the flow of solvent laden gas during the adsorption stage. After the steam sufficiently heats the adsorbent containing the solvent, the solvent begins to be desorbed. At first, the solvent is desorbed at a relatively high rate, but as the amount of solvent in the adsorbent decreases, the rate of desorption falls and a disproportionately large amount of steam is used to desorb the remaining solvent. Continued scrubbing with live steam to remove the last amount of solvent would be prohibitively expensive, so as a practical matter the scrubbing stage must be terminated short of complete desorption. After termination of the desorption stage, the adsorber vessel containing the adsorbent must be cooled and dryed so that the adsorber can again be placed in adsorption service.

A typical solvent recovery system will include at least two adsorber vessels for cyclic operation to permit continuous adsorption by the adsorbers, one may be operated for adsorption service while the other is being scrubbed; then, when the first adsorber must be scrubbed, the latter one can be returned to adsorption service.

SUMMARY OF THE INVENTION

The present invention specifically relates to improved methods for scrubbing an adsorber vessel whereby the consumption of desorbent is reduced, particularly at the end of the desorption stage when the amount of chemical substance remaining in the adsorbent is low. As noted, the yield of chemical substance near the end of the desorption stage continually diminishes, and desorption at this time becomes very costly. This increasing cost is primarily due to the cost of generating a continuous flow of desorbent to supply the recovery system, which desorbent generation --as where live steam is the desorbent -- consumes large amounts of energy to vaporize and superheat the desorbent. In accordance with the invention, normal scrubbing proceeds until the yield of chemical substance in the desorbent/chemical substance mixture leaving the adsorber falls to a preselected level. At that time, the supply of desorbent to the adsorber is reduced or terminated entirely, with desorption continuing by the recirculation of a portion of the mixture leaving the adsorber. As the mixture recirculates through the adsorber, it becomes enriched with more chemical substance that is desorbed from the adsorbent bed. During this recirculation period, a portion of the enriched mixture leaving the adsorber may be diverted for processing, where, for example, the mixture may be condensed and cooled and the chemical substance separated from the desorbent. When the chemical substance remaining in the adsorber has reached a sufficiently low level, the recirculation period is terminated, and thereafter the system may be cooled and dryed and placed into adsorption service again, or the adsorber may be purged for a short time by desorbent alone before such cooling and drying period. Accordingly, the purpose of the present invention is to overcome a major deficiency of presently known recovery systems by economically desorbing an adsorber vessel by including the step of recirculating a portion of the mixture leaving the adsorber during scrubbing.

It is an object of the present invention to provide recovery methods superior to those presently known in the art.

It is another object of the present invention to provide recovery methods that reduce the desorbent consumption during the scrubbing stage of operation.

It is a further object of the present invention to provide more economical methods of recovery of chemical substances.

Still further objects, features, and advantages of the present invention will become readily apparent to one skilled in the art from consideration of the description of the invention, the accompanying drawing and the appended claims.

DESCRIPTION OF THE DRAWING

The invention will be described by way of example with reference to the accompanying drawing which shows a schematic diagram of a conventional solvent recovery system employing two adsorber vessels, which conventional system is adapted to include portions that permit the system to operate in accordance with the preferred embodiment of the present invention.

DESCRIPTION OF THE PREFERRED EMBODIMENT

In the accompanying drawing is shown a solvent recovery system including two adsorber vessels 10, 12 which may be operated cyclically to provide continuous adsorption service. In practice, however, any number of adsorber vessels may be used in the recovery system, and the present invention is not dependent on the number of adsorber vessels employed. Each adsorber vessel includes a bed 14, 16 of adsorbent material, such as activated carbon, and may also include heat accumulator 18, 20, positioned as shown. Solvent laden gas is supplied by duct 22 with the aid of fan 24 and is directed to the individual adsorber vessels through ducts 26 and 28. The supply of solvent laden gas to the individual adsorber vessels is selectively controlled by operation of the valves 30 and 32 located in the ducts 26 and 28, respectively. After the solvent has been extracted by passing the solvent laden gas through the adsorbent bed, the cleansed gas is expelled from the adsorber vessels through an exhaust duct 34, 36. Operation of exhaust ducts 34 and 36 is controlled by the valves 38 and 40.

The desorption medium, which hereinafter is chosen to be live steam as an example, is supplied to the adsorber vessels 10, 12 from steam supply pipe 39 and is selectively applied to the adsorber vessels by control of the valves 42 and 44. Vapor pipes 46 and 48, controllable by valves 52 and 54, lead from the adsorbers to the pipe 49. It should be noted that the described configuration of the recovery system contemplates that steam is passed through the adsorbers 10, 12 in a direction opposite to the flow of solvent laden gas through the adsorbers.

Pipe 49 leads to condenser 50, separation chamber 56, cooler 60 and collection pipe 62. A return duct 58 is provided between separation chamber 56 and duct 22. Preferably, return duct 58 joins duct 22 at a point upstream of fan 24.

The description of the drawing thus far is a description of a conventional solvent recovery system. During continuous operation, one adsorber is placed in adsorption service while the other adsorber vessel is being desorbed in preparation for its return to adsorption service. Operation of such a system is hereinafter explained in more detail.

For the purpose of this explanation, it is assumed that adsorber vessel 10 is in adsorption service and adsorber vessel 12 is being scrubbed. While adsorber 10 is in adsorption service, valves 30 and 38 are open, and valves 42 and 52 are closed. Conversely, while adsorber 12 is being scrubbed, valves 44 and 54 are open, and valves 32 and 40 are closed. During conventional operation of the recovery system, the valves 80, 88, 90 and 92 are closed.

Solvent laden gas is supplied to the recovery system through duct 22, and fan 24 assists in propelling the mixture through duct 26 and open valve 30 into the adsorber vessel 10. As the solvent laden gas passes through the adsorbent bed 14, the solvent is adsorbed and the cleansed gas is expelled from the adsorber vessel through open valve 38 and exhaust duct 34. At this point, the cleansed gas is substantially entirely free of solvent and, as in the case where the carrier gas is air, may be expelled directly into the atmosphere. Adsorption in this manner continues until the adsorbent bed is fully charged with solvent. At that time, the adsorbent has reached a point of marginal adsorption efficiency; continuing adsorption beyond this point would result in the passing of undesirable levels of solvent.

To place the adsorber vessel 10 in condition for further adsorption service, the adsorbent bed 14 must first be desorbed. This is accomplished by scrubbing the adsorbent bed with live steam. During scrubbing of the adsorber 10, valves 30 and 38 are closed, thereby closing off the supply duct 26 and exhaust duct 34, and valves 42 and 52 are opened. Continuous operation of the recovery system is maintained by placing the freshly scrubbed adsorber vessel 12 into adsorption service while adsorber 10 is being scrubbed. Thus, valves 44 and 54 are closed, valves 32 and 40 are opened, and the solvent laden gas supplied through duct 22 is diverted to supply duct 28 and open valve 32, into adsorber vessel 12. The operation of adsorber 12 during adsorption service is the same as that of adsorber 10 just described.

During the conventional scrubbing process of adsorber 10, steam supplied from steam supply pipe 39 enters adsorber 10 through open valve 42, passes through adsorption bed 14, and exits the adsorber through open valve 52 and pipe 46. The flow of steam across the adsorption bed is counter to the flow of solvent laden gas across the bed during adsorption service. Because a greater amount of solvent is adsorbed at the upstream side of the adsorbent bed during adsorption than at the downstream side of the bed, scrubbing in the opposite direction minimizes the distance desorbed solvents must travel through the adsorbent bed, thereby increasing the effectiveness of the scrubbing process. Further, scrubbing in this manner ensures that the downstream side of the adsorbent bed during adsorption is fully desorbed for maximum effectiveness at the start of the following adsorption period. This minimizes the undesirable condition occurring during the adsorption process whereby solvent adsorbed at the downstream side of the adsorbent bed is taken up into the cleansed gas to be exhausted from the adsorber.

For an initial period following commencement of scrubbing, very little solvent is desorbed as the steam serves mainly to heat the adsorber and adsorbent bed. When the adsorbent bed is sufficiently heated, the solvent contained therein begins to evaporate and becomes entrained in the flow of steam. The rate of desorption is quite high at this time, but as the amount of solvent remaining in the adsorbent diminishes, the rate of desorption likewise decreases. During the latter portion of the scrubbing operation, desorption becomes very inefficient. As a practical matter, scrubbing must be terminated before desorption of the adsorbent bed is complete, because the cost of supplying a constant flow of live stream to complete the desorption process would be prohibitive.

The steam/solvent mixture leaving the adsorber vessel 10 during the scrubbing process flows through the vapor pipes 46 and 49 and to the condenser 50, in which are condensed the solvent and steam vapors. Incondensed gases and vapors are separated from the solvent and steam condensate in separation chamber 56 and are returned to the supply duct 22 for solvent laden gas by the return duct 58. Preferably, the return duct 58 joins the supply duct 22 upstream of fan 24 for returning the incondensible gases, which may include solvent vapor, to the adsorption process. The condensed solvent and steam from the condenser 50 and separation chamber 56 is further cooled in the cooler 60 to minimize revaporization, and may be recovered at the outlet pipe 62.

When scrubbing has terminated, the adsorbent bed is still moist and quite hot from the scrubbing process, and its adsorption efficiency is very low. Therefore it is necessary to subject a freshly scrubbed adsorber to a cooling and drying operation before the adsorber is returned to adsorption service. One method to perform this cooling and drying operation is to simply allow the cooler, solvent laden gas to pass through the adsorber, such as during the initial period of adsorption service. A heat accumulator 18, 20 may be used to heat the cooling/drying medium for a short time to assist in the drying of the adsorbent before it is cooled. Methods for preventing emissions with a high solvent content during this cooling and drying process are described in co-pending application Ser. No. 367,950 on which I am a coinventor.

A major disadvantage of the operation of conventional solvent recovery systems as previously described is the high cost of supplying live steam to the adsorber during the entire scrubbing operation. Although this cost may be decreased somewhat by terminating the scrubbing operation before desorption is complete, scrubbing must be continued until desorption is substantially complete in order that the duration of effective adsorption service may be maximized. The present invention overcomes this disadvantage of conventional recovery systems by the use of less live steam during the scrubbing process, with the attendant savings in cost.

With reference to the drawing, additional components may be added to a conventional recovery system to enable it to utilize the present invention. The vapor pipes 46 and 48 are connected to a propelling device, such as a steam jet ejector 84, through the pipe 91 and valve 92. The steam jet ejector is fed live steam from the steam supply pipe 39 through valve 80 and pipe 82. Typically, the amount of steam supplied to the steam jet ejector is much less than the flow of steam supplied to the adsorber vessel during conventional scrubbing. The mixture leaving the steam jet ejector 84 through pipe 86 is selectively supplied to the adsorber vessels 10 and 12 by control of valves 88 and 90, whereby the mixture is supplied to the same side of an adsorber vessel as was the live steam during conventional scrubbing.

According to the preferred embodiment of the present invention, the additional components operate to recirculate through an adsorber vessel during scrubbing a portion of the steam/solvent mixture leaving the adsorber. To explain this operation, it is assumed that adsorber 10 is undergoing desorption as previously explained and, particularly, the solvent desorption rate has reached a predetermined low level. Under conventional scrubbing methods, live steam would be used as the desorbent until the end of the scrubbing process. According to this example of the present invention, when the solvent desorption rate of the adsorber 10 has fallen to a predetermined low level, valve 42 is closed and valves 80, 92 and 88 are opened. A portion of the steam/solvent mixture leaving adsorber vessel 10 is recirculated to the adsorber by way of the open valve 52, vapor pipe 46, pipe 91, valve 92, steam jet ejector 84, duct 86 and valve 88. At this time, valve 90 is closed and valves 32, 40, 44 and 54 are in the states appropriate to adsorber 12 being in adsorption service.

Steam jet ejector 84 is controllable to determine the amount of steam/solvent mixture that is to be recirculated. The recycled steam/solvent mixture, diluted and pressurized by the high pressure live steam input from the steam jet ejector 84, continues desorption of the adsorbent bed. During recirculation, the diluted and pressurized mixture is enriched with solvent as it passes through the adsorbent bed and more solvent is desorbed. The portion of the enriched mixture that is not recirculated flows through pipe 49 to condenser 50 as during conventional scrubbing. This recirculation process may be continued until scrubbing has been completed, for example until the amount of solvent remaining in the adsorbent bed decreases to a predetermined value or the solvent content of the steam/solvent mixture leaving the adsorber falls to a predetermined level.

After the recirculation process, the adsorber 10 may be prepared for cooling and drying. Alternatively, it is desirable to briefly purge the adsorber vessel 10 with live steam subsequent to termination of the recirculation period. In this case, valves 80, 92 and 88 are closed, and valve 42 is opened for a short time to supply live steam to the adsorber vessel 10, thereby purging the adsorber vessel of any remaining steam/solvent vapors and ensuring that the downstream side of the adsorbent bed during adsorption is fully desorbed at the commencement of adsorption. Following this purging period, adsorber 10 may be cooled and dried as explained above.

When adsorber vessel 12 is being scrubbed, the recirculation system can be used in the same manner as described above. Valves 32 and 40 are of course closed; when the adsorber is switched from the conventional scrubbing process to recirculation, valve 44 is closed, and valves 54, 92, 90 and 80 are opened. The valves associated with the adsorber 10 are in the states appropriate for adsorber 10 to be in adsorption service, including valve 88 being closed. A portion of the steam/solvent mixture leaving adsorber vessel 12 is recirculated to the adsorber through the valve 54, vapor pipe 48, pipe 91, valve 92, steam ejector 84, duct 86 and valve 90. The remaining portion of the mixture leaving adsorber 12, enriched with solvent by the recirculation process, flows through pipe 49 to condenser 50. After this recirculation process, adsorber 12 may be purged for a short time with live steam or it may be directly cooled and dried in preparation for adsorption.

It is thus seen that an exemplary method of reducing the consumption of desorbent during the scrubbing process of a solvent recovery system has been disclosed which meets each of the aforementioned objectives. It will also be readily apparent to those skilled in the art that many variations of, and modifications to, the disclosed example may be made without departing from the spirit and scope of this invention. For example, the flow of live steam to an adsorber during the recirculation process may not be entirely terminated during recirculation, but may be left partially open to supplement the recirculated steam/solvent mixture. Further, the rate of such permitted flow of live steam to the adsorber may be varied, for example in accordance with the desorption rate of the solvent in the adsorbent bed or the amount of solvent in the steam/solvent mixture leaving the adsorber vessel.

The flow rate of the live steam feeding the steam jet ejector may be similarly varied. The steam jet ejector may also be replaced by other means to propel the steam/solvent mixture through the recirculation system, particularly if the flow of live steam to the adsorber is not completely terminated. One suitable alternative propelling means is a mechanical compressor.

The entire amount of the steam/solvent mixture leaving the adsorber during the recirculation process may be recirculated for a period of time before processing the mixture in the condenser, separation chamber and cooler.

The recirculation and purging processes described herein may be cycled to have alternating recirculation and purging periods.

Control of the various steps of the scrubbing operation may be responsive to any of a number of variables, including the desorption rate of the adsorbent bed, the amount of solvent in the steam/solvent mixture leaving the adsorber, the ratio of steam to solvent in the mixture leaving the adsorber, and a preselected time duration.

As previously mentioned hereinabove, desorbent media other than live steam and an adsorbent other than activated carbon may be used by the recovery system, and the teaching of the present invention may be employed in recovery systems for chemical substances other than solvents.

I claim:

1. In a desorption stage in the operation of a system for recovering a chemical substance from a carrier medium, wherein an externally supplied desorbent used in the desorption of an adsorber in said system is heated prior to its introduction to said adsorber, the method for reducing consumption of said preheated desorbent during the desorption of said adsorber comprising the steps of:

initiating a flow of said preheated desorbent through the adsorber to commence the desorption operation;

reducing the flow of said preheated desorbent entering the adsorber at a predetermined time during the desorption operation; and recirculating through the adsorber for a predetermined time a portion of the mixture leaving the adsorber, without heating said portion, to effect further desorption of the adsorber.

2. The method of claim 1 wherein the chemical substance is a solvent.

3. The method of claim 1 wherein the desorbent is live steam.

4. The method of claim 1 wherein the adsorber includes an adsorbent bed comprising activated carbon.

5. The method of claim 1 wherein the flow of desorbent entering the adsorber is reduced in response to the level of chemical substance in the mixture leaving the adsorber reaching a predetermined level.

6. The method of claim 1 wherein the manner of reduction of the flow of desorbent entering the adsorber is predetermined.

7. The method of claim 6 wherein the predetermined manner of reduction of the flow of desorbent entering the adsorber is a constant rate.

8. The method of claim 1 wherein the flow of desorbent entering the adsorber is terminated at said predetermined level.

9. The method of claim 1 wherein the duration of the recirculation period is dependent upon the level of chemical substance in the mixture leaving the adsorber reaching a predetermined level.

10. The method of claim 1 wherein the entire amount of mixture leaving the adsorber is recirculated.

11. The method of claim 1 wherein the portion of mixture recirculated is variable.

12. The method of claim 1 wherein the recirculation is assisted by the use of a propelling means.

13. The method of claim 12 wherein the propelling means is a desorbent jet ejector.

14. The method of claim 12 wherein the propelling means is a mechanical compressor.

15. The method of claim 1 wherein the recirculated portion of the mixture leaving the adsorber is supplemented with desorbent.

16. The method of claim 15 wherein the flow of desorbent supplementing the recirculated mixture is less than the flow of desorbent entering the adsorber prior to its reduction.

17. The method of claim 1 wherein a portion of the mixture leaving the adsorber is diverted for processing.

18. The method of claim 17 wherein the processing includes passing the diverted mixture through a condenser.

19. The method of claim 1 wherein following the recirculation period the adsorber is prepared for further adsorption.

20. The method of claim 19 wherein following the recirculation period the adsorber is placed in a cooling and drying state.

21. The method of claim 1 wherein following the recirculation period desorbent is passed through the adsorber for a predetermined time.

22. The method of claim 21 wherein the duration of the period of resumed desorbent flow is dependent upon the level of chemical substance in the mixture leaving the adsorber.

* * * * *